United States Patent
Meng

(10) Patent No.: US 9,749,604 B2
(45) Date of Patent: Aug. 29, 2017

(54) METHOD AND DEVICE FOR MULTI-SOURCE CONTROL OF INTELLIGENT MINIATURE PROJECTOR

(71) Applicant: ZTE Corporation, Shenzhen, Guangdong (CN)

(72) Inventor: Qingzhao Meng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 29 days.

(21) Appl. No.: 14/417,057

(22) PCT Filed: May 15, 2014

(86) PCT No.: PCT/CN2014/077584
§ 371 (c)(1),
(2) Date: Jan. 23, 2015

(87) PCT Pub. No.: WO2014/183659
PCT Pub. Date: Nov. 20, 2014

(65) Prior Publication Data
US 2015/0189246 A1    Jul. 2, 2015

(30) Foreign Application Priority Data
Dec. 6, 2013    (CN) .......................... 2013 1 0656349

(51) Int. Cl.
*H04N 5/268*    (2006.01)
*H04N 9/31*    (2006.01)
(Continued)

(52) U.S. Cl.
CPC ....... *H04N 9/3179* (2013.01); *H04L 65/4084* (2013.01); *H04N 5/268* (2013.01);
(Continued)

(58) Field of Classification Search
USPC .................. 348/705, 744; 353/28, 30, 39
See application file for complete search history.

(56) References Cited

U.S. PATENT DOCUMENTS 8,640,166 B1 * 1/2014 Craner ............... H04N 21/4826
725/37
9,033,523 B2 * 5/2015 Takemoto ............... H04N 5/268
348/189

(Continued)

FOREIGN PATENT DOCUMENTS

CN         101980143 A       2/2011

OTHER PUBLICATIONS

International Search Report in international application No. PCT/CN2014/077584, mailed on Sep. 4, 2014.
(Continued)

*Primary Examiner* — Paulos M Natnael
(74) *Attorney, Agent, or Firm* — Oppedahl Patent Law Firm LLC

(57) ABSTRACT

Described are a method and device for multi-source control of an intelligent miniature projector. With the method, connection of intelligent miniature projector equipment with multiple UEs is established; after a projection request sent by a first UE is received, when it is detected that played content of a second UE is being projected, a switching confirmation prompt is sent to the second UE; and after the second UE's consent for switching is received, the current projection process is stopped, a response to the projection request of the first UE is made, and played content of the first UE is projected.

6 Claims, 2 Drawing Sheets

(51) Int. Cl.
*H04W 84/00* (2009.01)
*H04L 29/06* (2006.01)
*H04L 29/02* (2006.01)

(52) U.S. Cl.
CPC ......... *H04N 9/3147* (2013.01); *H04N 9/3173* (2013.01); *H04W 84/00* (2013.01); *H04L 29/02* (2013.01)

(56) References Cited

U.S. PATENT DOCUMENTS

| | | | | |
|---|---|---|---|---|
| 9,313,258 B2* | 4/2016 | Stransky-Heilkron | | H04L 67/025 |
| 2004/0187041 A1* | 9/2004 | Kikugawa | ............. | G06F 1/3203 713/300 |
| 2005/0123109 A1* | 6/2005 | Yamagishi | ............. | H04L 12/12 379/102.01 |
| 2005/0158065 A1* | 7/2005 | Matsuda | ............. | G06F 13/4072 399/66 |
| 2005/0160479 A1 | 7/2005 | Kubota | | |
| 2006/0135165 A1* | 6/2006 | Faccin | .................. | H04W 36/02 455/436 |
| 2009/0036158 A1* | 2/2009 | Fujinawa | ............... | G03B 17/54 455/556.1 |
| 2009/0213332 A1* | 8/2009 | Fujinawa | ............. | H04N 9/3141 353/15 |
| 2010/0225828 A1* | 9/2010 | Yamada | ............... | G11B 31/006 348/731 |
| 2010/0232767 A1* | 9/2010 | Sasaki | .................. | G11B 27/105 386/341 |
| 2010/0269137 A1* | 10/2010 | Nakajima | ............... | G09G 5/003 725/39 |
| 2011/0055325 A1 | 3/2011 | Kubota | | |
| 2012/0266225 A1 | 10/2012 | Kubota | | |
| 2013/0176494 A1 | 7/2013 | Takemoto | | |
| 2013/0176497 A1* | 7/2013 | Kawai | .................... | H04N 5/268 348/705 |
| 2014/0082083 A1 | 3/2014 | Kubota | | |
| 2015/0009414 A1* | 1/2015 | Hagiwara | ................ | H04N 5/74 348/744 |
| 2015/0040023 A1* | 2/2015 | Stransky-Heilkron | | H04N 21/43615 715/740 |

OTHER PUBLICATIONS

Supplementary European Search Report in European application No. 14797108.9, mailed on Jun. 10, 2015.
English Translation of the Written Opinion of the International Search Authority in international application No. PCT/CN2014/077584, mailed on Sep. 4, 2014.

* cited by examiner

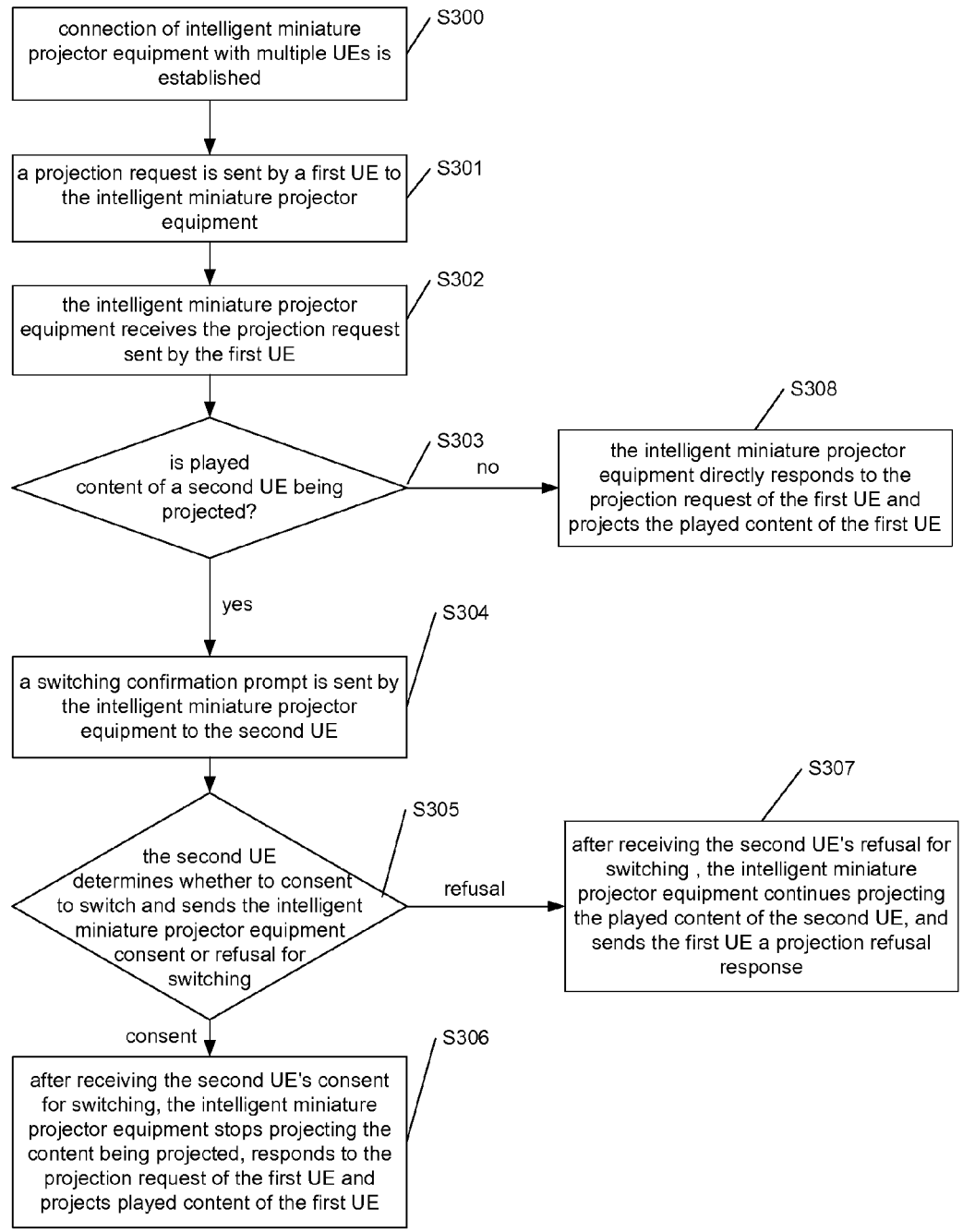

METHOD AND DEVICE FOR MULTI-SOURCE CONTROL OF INTELLIGENT MINIATURE PROJECTOR

TECHNICAL FIELD

The disclosure relates to the field of intelligent miniature projectors, and in particular to a method and device for controlling multiple sources of an intelligent miniature projector.

BACKGROUND

At present, projector equipment applies widely to various aspects of daily life. With development and advance of science and technology, projector equipment on one hand becomes increasingly specialized, High-Definition, and full-featured to meet a demand for specialization; on the other hand becomes increasingly intelligent, miniature, and portable to meet a demand for use in multiple occasions. In a practical application, the intelligent miniature projector equipment too applies gradually to daily life.

With intellectualization of projector equipment, interaction and modes of connection between other user equipment (UE) and the intelligent miniature projector equipment become increasingly diversified. The modes of connection mainly include: a wired connection based on an external interface, which has been used first and tends to be limited by hardware and User Interface (UI) design of a UE; and a wireless connection based on various protocol standards, which demands use of no physical line and is convenient and flexible, independent of UI design of a UE. With such a wireless connection, simultaneous connection to multiple different UEs may be implemented. Simultaneous connection to multiple UEs may render wider and more flexible application of the intelligent miniature projector equipment. In this case, however, an issue of coordination of multiple UEs connected simultaneously must be addressed.

A main focus in related art is to establish connection and sharing of one-to-one projector-played content between the intelligent miniature projector equipment and a UE, instead of implementing switch of connection of multiple different UEs to the intelligent miniature projector equipment.

SUMMARY

In view of this, it is desired that an embodiment herein provides a method and device for controlling multiple sources of an intelligent miniature projector.

An embodiment herein provides a method for controlling multiple sources of an intelligent miniature projector, applying to intelligent miniature projector equipment connected to multiple User Equipments (UE). The method includes:

after receiving a projection request sent by a first UE, when it is detected that played content of a second UE is being projected, sending the second UE a switching confirmation prompt; and after receiving the second UE's consent for switching, stopping projecting the content being projected, sending the first UE a response consenting to the projection request of the first UE and projecting played content of the first UE.

The method may further include: after receiving the second UE's refusal for switching, continuing projecting the played content of the second UE, and sending the first UE a response refusing the projection request.

The method may further include: when it is detected that no content is being projected, directly sending the first UE a response consenting to the projection request of the first UE and projecting the played content of the first UE.

The intelligent miniature projector equipment may be connected to the multiple UEs using a wireless mode including but not limited to WIFI, BT, DLNA, and WIFI Display.

The switching confirmation prompt may be sent in an aurally or visually perceivable form.

An embodiment herein further provides a device for controlling multiple sources of an intelligent miniature projector. The device includes a connection module, an intelligent processing module, and a projecting module.

The connection module may be configured for establishing connection to multiple User Equipments (UE).

The intelligent processing module may be configured for: after receiving a projection request sent by a first UE, when it is detected that played content of a second UE is being projected by the projecting module, sending the second UE a switching confirmation prompt; and after receiving the second UE's consent for switching, transferring both the projection request sent by the first UE and the second UE's consent for switching to the projecting module.

The projecting module may be configured for: after receiving the projection request of the first UE and the second UE's consent for switching transferred by the intelligent processing module, stopping projecting the content being projected, sending the first UE a response consenting to the projection request of the first UE and projecting played content of the first UE.

The intelligent processing module may be configured for: after receiving the second UE's refusal for switching, sending the first UE a response refusing the projection request and transferring the second UE's refusal for switching to the projecting module.

The projecting module may be configured for: after receiving the second UE's refusal for switching transferred by the intelligent processing module, continuing projecting the played content of the second UE.

The intelligent processing module may be configured for: when it is detected that the projecting module is idle and is projecting no content, transferring the received projection request sent by the first UE to the projecting module.

The projecting module may be configured for: after receiving the projection request sent by the first UE transferred by the intelligent processing module, directly sending the first UE a response consenting to the projection request of the first UE and projecting the played content of the first UE.

The connection module may be configured for establishing connection to the multiple UEs using a wireless mode including but not limited to WIFI, BT, DLNA, and WIFI Display.

The intelligent processing module may be configured for sending the switching confirmation prompt to the second UE in an aurally or visually perceivable form.

With a method and device for controlling multiple sources of an intelligent miniature projector according to an embodiment herein, intelligent miniature projector equipment is connected to multiple UEs; after a projection request sent by a first UE is received, when it is detected that played content of a second UE is being projected, a switching confirmation prompt is sent to the second UE; and after the second UE's consent for switching is received, the current projection process is stopped, a response consenting to the projection request of the first UE is sent to the first UE and played content of the first UE is projected, thus implementing flexible switch of the intelligent miniature projector equipment between multiple different UEs, thereby improving projection efficiency.

BRIEF DESCRIPTION OF THE DRAWINGS

FIG. 3 is a specific flowchart of implementing a method for controlling multiple sources of an intelligent miniature projector according to an embodiment herein.

DETAILED DESCRIPTION

In an embodiment herein, connection of intelligent miniature projector equipment with multiple UEs is established; after a projection request sent by a first UE is received, when it is detected that played content of a second UE is being projected, a switching confirmation prompt is sent to the second UE; and after the second UE's consent for switching is received, the current projection process is stopped, and a response consenting to the projection request is sent to the first UE to project played content of the first UE.

In a practical application, there may be two kinds of projection requests sent by the first UE.

A projection request sent by the first UE may include a played file to be projected. In this case, as the played file has been received, in responding to the projection request of the first UE and projecting the played content of the first UE, the intelligent miniature projector equipment may directly send the first UE a response consenting to the projection request of the first UE and project the played file of the first UE.

Alternatively, a projection request sent by the first UE may include no played file to be projected. In this case in responding to the projection request of the first UE and projecting the played content of the first UE, while responding to the projection request of the first UE, the intelligent miniature projector equipment has to send the first UE a played file acquiring request; and may receive and then project and play a file sent by the first UE.

In specific description below, an embodiment herein is elaborated with an example of a projection request sent by the first UE that includes a played file to be projected.

Here, the UE may be a mobile phone, a TV set, a multimedia computer, a multimedia board, an internet node, a communicator, a PC, a Personal Digital Assistant (PDA), a digital camera, a digital camcorder, an MP3 player, an MP4 player or any combination thereof.

Here, the first UE and the second UE each are one of intelligent UEs connected to the intelligent miniature projector equipment. The first UE sends the intelligent miniature projector equipment a projection request. The second UE is currently using the intelligent miniature projector equipment to project and play content.

Figure 1:
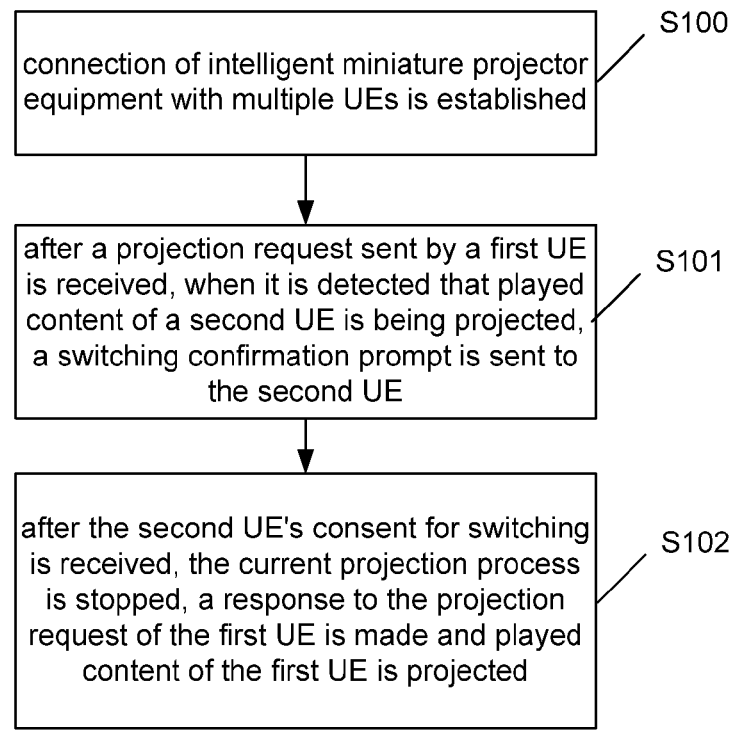
FIG. 1 is a flowchart of implementing a method for controlling multiple sources of an intelligent miniature projector according to an embodiment herein.

FIG. 1 is a flowchart of implementing a method for controlling multiple sources of an intelligent miniature projector according to an embodiment herein. As shown in FIG. 1, a method for controlling multiple sources of an intelligent miniature projector according to an embodiment herein may include steps as follows.

In step S100, connection of intelligent miniature projector equipment with multiple UEs is established.

Here, the intelligent miniature projector equipment may be connected to the multiple UEs using a wireless mode including, but not limited to, WIFI, BT, DLNA, WIFI Display, etc.

In step S101, after a projection request sent by a first UE is received, when it is detected that played content of a second UE is being projected, a switching confirmation prompt is sent to the second UE.

Here, the projection request sent by the first UE may include the to-be-projected played file of the first UE.

The detection may be implemented as follows: an intelligent processing module in the intelligent miniature projector equipment may detect, through information exchange, whether a projecting module is projecting the played content of the second UE.

Here, the switching confirmation prompt may be sent in an aurally or visually perceivable form. In addition, an interface provides consent and refusal options to be selected by the user of the second UE.

When it is detected that no content is being projected, a direct response consenting to the projection request of the first UE is sent to the first UE to project the played content of the first UE.

In step S102, after the second UE's consent for switching is received, the current projection process is stopped, a response consenting to the projection request of the first UE is sent to the first UE and played content of the first UE is projected.

When the second UE's refusal for switching is received, projection of the played content of the second UE continues, and a response refusing the projection request is sent to the first UE.

Figure 2:
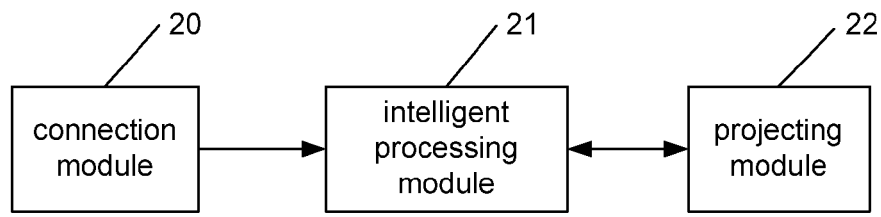
FIG. 2 is a schematic diagram of a structure of a device for controlling multiple sources of an intelligent miniature projector according to an embodiment herein.

FIG. 2 is a schematic diagram of a structure of a device for controlling multiple sources of an intelligent miniature projector according to an embodiment herein. As shown in FIG. 2, a device for controlling multiple sources of an intelligent miniature projector according to an embodiment herein may include a connection module 20, an intelligent processing module 21, and a projecting module 22.

The connection module 20 may be configured for establishing connection to multiple UEs.

Here, the connection module 20 may establish connection to the multiple UEs using a wireless mode including, but not limited to, WIFI, BT, DLNA, WIFI Display, etc.

The intelligent processing module 21 may be configured for: after receiving a projection request sent by a first UE, when it is detected that played content of a second UE is being projected by the projecting module 22, sending the second UE a switching confirmation prompt; and after receiving the second UE's consent for switching, transferring both the projection request sent by the first UE and the second UE's consent for switching to the projecting module 22.

Here, the projection request sent by the first UE may include the to-be-projected played file of the first UE.

Here, the intelligent processing module 21 may send the switching confirmation prompt to the second UE in an aurally or visually perceivable form. In addition, an interface provides consent and refusal options to be selected by the user of the second UE.

The projecting module 22 may be configured for: after receiving the projection request of the first UE and the second UE's consent for switching transferred by the intelligent processing module 21, stopping projecting the content being projected, sending the first UE a response consenting to the projection request of the first UE and projecting played content of the first UE.

The intelligent processing module 21 may be configured for: when it is detected that the projecting module 22 is idle and is projecting no content, transferring the received projection request sent by the first UE to the projecting module 22. The projecting module 22 may be configured for: after receiving the projection request sent by the first UE transferred by the intelligent processing module 21, directly sending the first UE a response consenting to the projection request of the first UE and projecting the played content of the first UE.

The intelligent processing module 21 may be configured for: after receiving the second UE's refusal for switching, sending the first UE a response refusing the projection request and transferring the second UE's refusal for switching to the projecting module 22. The projecting module 22 may be configured for: after receiving the second UE's refusal for switching transferred by the intelligent processing module 21, continuing projecting the played content of the second UE.

In a practical application, the connection module 20, the intelligent processing module 21, the projecting module 22 may be implemented by a Central Processing Unit (CPU), a Micro-Processing unit (MPU), a Digital Signal Processor (DSP), or a Field-Programmable Gate Array (FPGA) located at the intelligent miniature projector equipment.

FIG. 3 is a specific flowchart of implementing a method for controlling multiple sources of an intelligent miniature projector according to an embodiment herein. As shown in FIG. 3, a method for controlling multiple sources of an intelligent miniature projector according to an embodiment herein may include steps as follows.

In step S300, connection of intelligent miniature projector equipment with multiple UEs is established.

In step S301, a projection request is sent by a first UE to the intelligent miniature projector equipment.

In step S302, the intelligent miniature projector equipment receives the projection request sent by the first UE.

In step S303: the intelligent miniature projector equipment detects whether played content of a second UE is being projected. When played content of a second UE is being projected, the flow goes to step S304; otherwise when no content is being projected, the flow goes to step S308.

In step S304, a switching confirmation prompt is sent by the intelligent miniature projector equipment to the second UE.

Here, the switching confirmation prompt may be implemented in an aurally or visually perceivable form. In addition, an interface provides consent and refusal options to be selected by the user of the second UE.

In step S305, the second UE determines whether to consent to switch and sends the intelligent miniature projector equipment consent or refusal for switching. When the second UE consents to switch, the flow goes to step S306. When the second UE refuses to switch, the flow goes to step S307.

In step S306, after receiving the second UE's consent for switching, the intelligent miniature projector equipment stops projecting the content being projected, sends the first UE a response consenting to the projection request of the first UE in step S301 and projects played content of the first UE. The flow ends.

In step S307, after receiving the second UE's refusal for switching, the intelligent miniature projector equipment continues projecting the played content of the second UE, and sends the first UE a response refusing the projection request. The flow ends.

In step S308, the intelligent miniature projector equipment directly sends the first UE a response consenting to the projection request of the first UE and projects the played content of the first UE.

What described are merely embodiments of the disclosure and are not intended to limit the scope of the disclosure.

The invention claimed is:

1. A method for controlling multiple sources of a projector, applying to projector equipment connected wirelessly to multiple User Equipments (UE); the method comprising:
   after receiving a projection request sent by a first UE, when detecting that played content of a second UE is being projected by the projector equipment, sending, by the projector equipment, the second UE a switching confirmation prompt;
   after receiving the second UE's consent for switching, stopping, by the projector equipment, projecting the content of the second UE being projected, sending the first UE a response consenting to the projection request of the first UE, and projecting played content of the first UE;
   after receiving the second UE's refusal for switching, continuing projecting, by the projector equipment, the played content of the second UE, and sending the first UE a response refusing the projection request; and
   when detecting that no content is being projected by the projector equipment, directly sending, by the projector equipment, the first UE a response consenting to the projection request of the first UE, and projecting the played content of the first UE.

2. The method according to claim 1, wherein the projector equipment is connected to the multiple UEs using a wireless mode comprising but not limited to WIFI, BT, DLNA, and WIFI Display.

3. The method according to claim 1, wherein the switching confirmation prompt is sent in an aurally or visually perceivable form.

4. A projector equipment, comprising:
   at least one hardware processor;
   a non-transitory computer-readable medium storing computer readable instructions executable by the at least one hardware processor,
   wherein the at least one hardware processor is configured for:
   establishing wireless connection to multiple User Equipments (UE);
   after receiving a projection request sent by a first UE, when it is detected that played content of a second UE is being projected by the projector equipment, sending the second UE a switching confirmation prompt;
   after receiving the second UE's consent for switching, stopping projecting the content of the second UE being projected, sending the first UE a response consenting to the projection request of the first UE, and projecting played content of the first UE;
   after receiving the second UE's refusal for switching, continuing projecting the played content of the second UE, and sending the first UE a response refusing the projection request; and
   when detecting that no content is being projected by the projector equipment, directly sending the first UE a response consenting to the projection request of the first UE, and projecting the played content of the first UE.

5. The projector equipment according to claim 4, wherein the at least one hardware processor is configured for establishing connection to the multiple UEs using a wireless mode comprising but not limited to WIFI, BT, DLNA, and WIFI Display.

6. The projector equipment according to claim 4, wherein the at least one hardware processor is configured for sending the switching confirmation prompt to the second UE in an aurally or visually perceivable form.

\* \* \* \* \*